United States Patent [19]

Lechevalier

[11] Patent Number: 5,578,997
[45] Date of Patent: Nov. 26, 1996

[54] FUEL DETECTOR FOR A TURBOJET ENGINE OIL TANK

[75] Inventor: Michel M. A. A. Lechevalier, Mormant, France

[73] Assignee: Societe Nationale D'Etude et de Construction de Moteurs D'Aviation S.N.E.C.M.A., Paris, France

[21] Appl. No.: 144,532

[22] Filed: Nov. 2, 1993

[30] Foreign Application Priority Data

Nov. 4, 1992 [FR] France .................................. 92 13170

[51] Int. Cl.⁶ ................................................. G08B 17/10
[52] U.S. Cl. .......................... 340/632; 340/592; 340/384; 340/591
[58] Field of Search .................................... 340/591, 592, 340/593, 584, 632, 570; 48/103 R, 79; 422/88, 89; 436/60, 139; 73/23.2; 149/108.2

[56] References Cited

U.S. PATENT DOCUMENTS

| | | | |
|---|---|---|---|
| 4,134,112 | 1/1979 | Kercheval et al. | 340/632 |
| 4,377,933 | 3/1983 | Loujou | 60/89.08 |
| 4,402,776 | 9/1983 | Whipps | 149/108.2 |
| 4,631,952 | 12/1986 | Donaghey | 73/23 |
| 4,735,081 | 4/1988 | Luoma et al. | 73/23 |
| 4,793,799 | 12/1988 | Goldstein et al. | 340/570 |
| 4,812,826 | 3/1989 | Kaufman et al. | 340/592 |

FOREIGN PATENT DOCUMENTS

| | | |
|---|---|---|
| 58-187834 | 2/1983 | Japan. |
| 2166232 | 4/1986 | United Kingdom. |

OTHER PUBLICATIONS

Japanese Abstract Publication No. JP8187834–Feb. 11, 1983.
Japanese Abstract Publication No. JP2108843–Feb. 04, 1990.

*Primary Examiner*—Brent A. Swarthout
*Assistant Examiner*—Ashok Mannara
*Attorney, Agent, or Firm*—Bacon & Thomas

[57] ABSTRACT

An apparatus for detecting fuel vapors in a turbojet engine oil tank is disclosed which incorporates a device in the oil tank which senses the presence of fuel vapors in the oil tank. The device has a housing defining an inner chamber in which a piston is slidably located. An actuating cartridge is also located in the chamber between an end wall of the housing and the piston. The cartridge comprises a material which expands in volume when subjected to heat and one which produces an exothermic reaction in the presence of fuel vapors. The housing defines one or more orifices to enable the atmosphere within the tank to communicate with the actuating cartridge.

7 Claims, 2 Drawing Sheets

FUEL DETECTOR FOR A TURBOJET ENGINE OIL TANK

BACKGROUND OF THE INVENTION

The present invention relates to a system for detecting the presence of fuel in an oil tank of a turbojet engine.

Initiation and growth of fire aboard an aircraft can have catastrophic results. On-board fire extinguishers are mandatory, but the possibility of such fires can be minimized by eliminating the possible sources of fire. The fluids which may catch fire in a gas-turbine engine are foremost the fuel and next, the oil. Fuel and oil leaks may arise from poor seals and also from damage to mechanical parts. In order to minimize the possibility of on-board fires, such leaks must be prevented at all costs.

Most of today's modern turbojet engines are equipped with an oil-fuel heat exchanger mounted in the lubrication circuit of the engine. If a leak arises between the fuel and oil circuits, as a rule it will be from the fuel circuit into the oil circuit, due to the higher pressure of the fuel. The consequences of such leakage are dire. Diluting the oil with fuel increases the danger of internal engine fires, especially when the aircraft has just landed on the ground. In this instance, when the engine has been shut down, the air-oil labrynth seals are at their maximum and the engine temperature is still high. In addition, the fuel-diluted oil degrades the lubrication properties of the oil, thereby resulting in increased wear and clearances between mechanical parts. An additional source is the overflowing of the oil tank. If the oil pressure is atmospheric, the oil tank will overflow outwardly and, if the oil tank is at the pressure of an inner engine enclosure, the enclosure will be flooded.

The aircraft crew must be warned by an alarm if there is damage to the fuel-oil heat exchanger so that the affected engine may be stopped in flight. In flight, it is possible to ventilate and thereby eliminate the fuel from the engine enclosures and to cool the engine. Thus, the danger of fire while in flight is reduced, compared to the danger immediately after the engine has been stopped on the ground.

As a rule, the presence of fuel in the oil circuit increases the liquid volume in the oil tank. Known detection systems for detecting fuel in the oil circuit are based upon measuring the variation in liquid volume within the oil tank, or in the enclosure containing the turbine bearings. Of necessity, these known systems require a long response time, since they must also take into account the ordinary variations in oil volume related to temperature variations and to changing engine operating modes which take place even when there is no fuel mixed with the oil. Quite obviously, these known systems do not provide the required accuracy and response time necessary in order to minimize the danger of on-board engine fires.

SUMMARY OF THE INVENTION

An apparatus for detecting fuel vapors in a turbojet engine oil tank is disclosed which incorporates a device in the oil tank which senses the presence of fuel vapors in the oil tank. The device has a housing defining an inner chamber in which a piston is slidably located. An actuating cartridge is also located in the chamber between an end wall of the housing and the piston. The cartridge comprises a material which expands in volume when subjected to heat and one which produces an exothermic reaction in the presence of fuel vapors. The housing defines one or more orifices to enable the atmosphere within the tank to communicate with the actuating cartridge.

In normal turbojet engine operation, the temperature of the oil in the tank may reach and exceed 100° C. When fuel is present in the oil, the elevated temperature of the oil will cause the fuel to produce a fuel vapor within the oil tank above the level of the oil.

The device for detecting the presence of fuel vapors may be either located within the portion of the tank above the normal oil level, or may be located externally of the tank and communicate with this space such that any fuel vapors in the tank will communicate with the actuating cartridge. The presence of fuel vapors will cause the actuating cartridge to produce heat and expand in volume, thereby causing the piston in the housing to move relative to the housing. The piston is connected to an alarm system whereby the movement of the piston activates the alarm to warn the aircraft crew.

The present system enables the fuel in the oil tank to be detected regardless of changes in liquid volume in the oil lubricating circuit.

The actuating cartridge may be formed from a silicone elastomer which is known per se for making silicone caulking with anti-knock and anti-fungal properties. This material is able to react exothermally in the presence of fuel and will increase in volume by approximately 50% in the presence of fuel vapors.

DETAILED DESCRIPTION OF THE PREFERRED EMBODIMENTS

Figure 1:
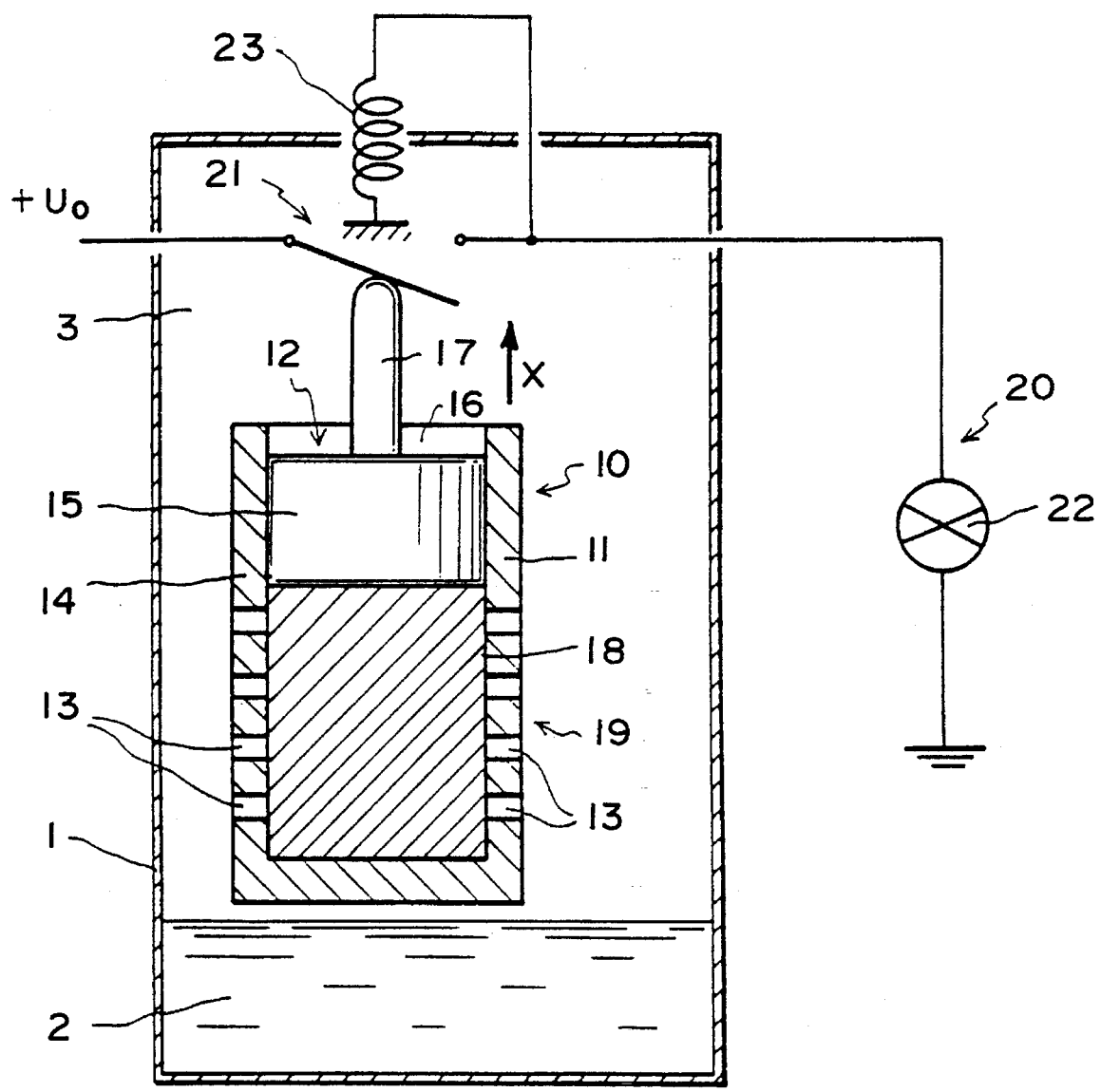
FIG. 1 is a schematic, cross-sectional view of the fuel-vapor detector according to a first embodiment of the present invention.

The drawings illustrate an oil tank 1 for supplying lubricating oil to the lubrication circuit (not shown) of a turbojet engine (not shown). The oil tank 1 contains a volume of oil 2 in its lower portion above which is an air atmosphere 3 which, as a rule, is at the outside pressure of the engine due to the location of vents in the oil tank (not shown).

A fuel-vapor detector 10 is shown on an enlarged scale and is located within the atmosphere 3 of the oil tank 1. Although the invention will be described with the fuel-vapor detector 10 within the oil tank 1, it is to be understood that the detector may be located externally of the tank, as long as it communicates with the atmosphere 3 within the tank. The detector 10 is associated with an alarm system 20 which, in this particular instance comprises an electrically actuated pilot light 22 located in the aircraft cockpit, a source of electrical power $U_o$ and a switch 21. The switch 21 is a known latching type and, once closed, is kept closed by a suitable device, such as a solenoid 23. Obviously, the pilot light 22 may be replaced by other warning devices, which may be visual, audible, or both.

The detector 10 comprises a housing 11 generally cylindrical in configuration and defining an inner chamber 12 which communicates with the atmosphere 3 within the oil tank via a plurality of orifices 13 formed in the wall 14 of the housing 12. A piston 15 is slidably mounted within the chamber 12 so that it may slide along the inner surface of wall 14. The piston 15 divides the chamber into a first chamber portion 16 and a second chamber portion 18. A piston rod 17 which is fixedly attached to the piston 15 extends through the first chamber portion 16 as seen in the figures. As illustrated, vertical movement of the piston 15 will cause the piston rod 17 to close the switch 21 and actuate the warning light 22.

The second chamber portion contains an actuating cartridge 19, the composition of which is discussed below. As illustrated, the second chamber portion 18 communicates with the atmosphere 3 via orifices 13, while the first chamber portion 16 directly communicates with the atmosphere 3 through the upper opening 25. The drawings illustrate the switch 21 being located outside the housing 11, however, the upper opening 25 may be sealed by a wall which defines orifices to enable the first chamber portion 16 to communicate with the atmosphere 3. In this particular instance, the switch 21, as well as the solenoid 23 may also be mounted within the first chamber portion 16. In this configuration, the detector 10 will be fitted with two external terminals for connection to the power source and to the warning light 22.

Figure 2:
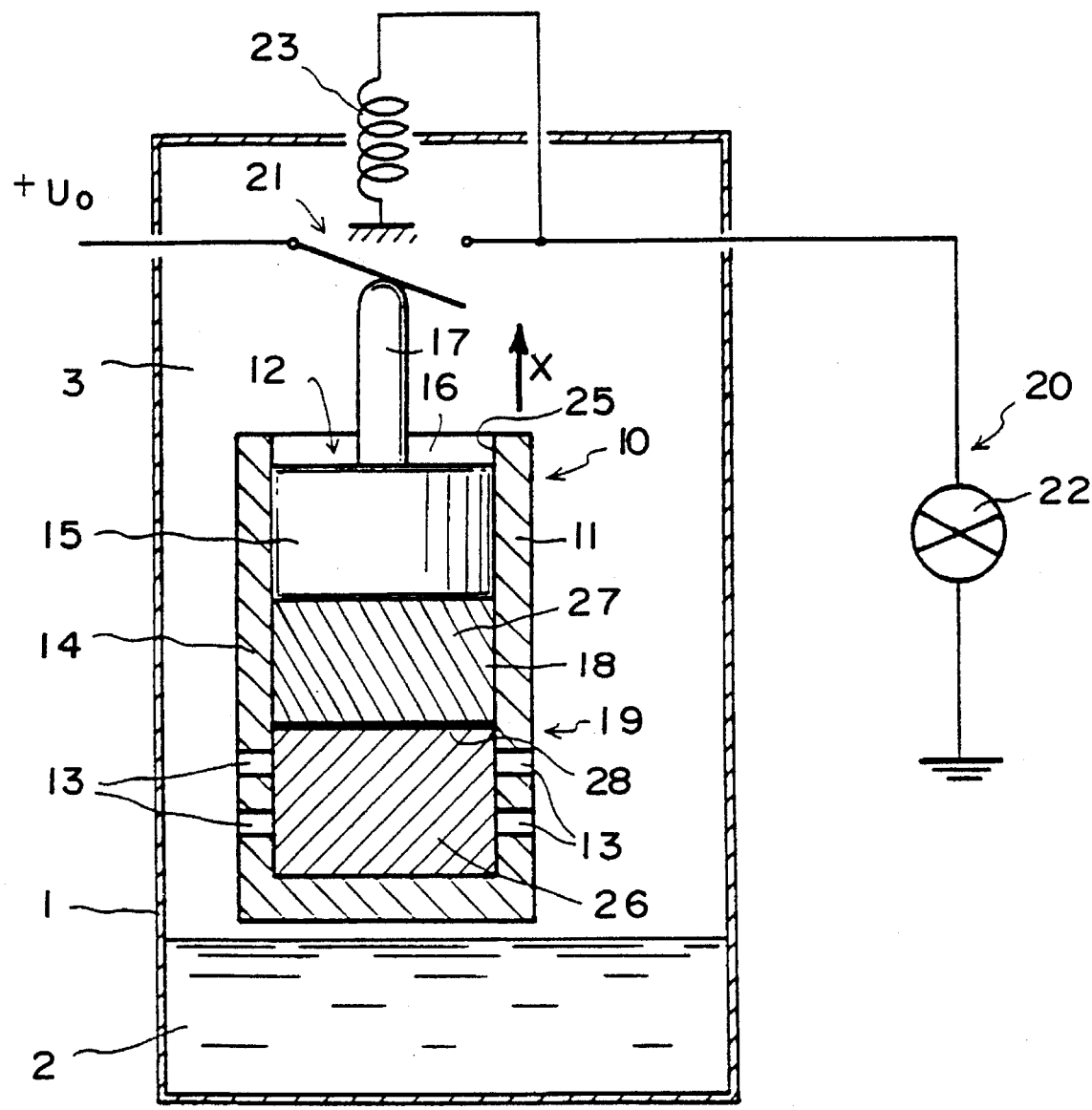
FIG. 2 is a schematic, cross-sectional view similar to FIG. 1, but illustrating a second embodiment of the fuel vapor detector according to the present invention.

The actuating cartridge 19 contains at least one compound which, in the presence of fuel, produces an exothermic reaction. Preferably, this compound is a silicon based elastomer having anti-knock and anti-fungal properties, such as a fluorinated silicone elastomer and which increases in volume by approximately 50% in the presence of fuel vapor. In the first embodiment, as illustrated in FIG. 1, the actuating cartridge 19 completely fills the second chamber portion 18. In the second embodiment, illustrated in FIG. 2, the actuating cartridge 19 comprises a layer of first material 26 which reacts chemically in the presence of fuel vapor by releasing heat and a layer of second material 27 which has a large coefficient of thermal expansion located between the layer of first material 26 and the piston 15. The layer of second material may comprise wax such as that used in thermostatic valves of heat exchangers.

Optionally, a metal partition 28 comprising a material having good thermal conducting properties, such as copper or aluminum, is inserted between the layers of first material 26 and second material 27. In this embodiment, the compound used is also preferably a silicon based elastomer, such as a fluorinated silicone elastomer which will not return to its initial volume once the volume has increased in the presence of fuel vapor.

As can be seen, when fuel is mixed with the oil in the tank 1, fuel vapors will be released into the atmosphere 3 due to the high temperature of the oil. The fuel vapors will react with the material of the actuating cartridge 19 thereby causing the cartridge to increase in volume. Such volume increase occurs due to the volume of the compound itself increasing in the presence of fuel vapors and because of the exothermic chemical reaction of the material which generates heat. The increase in volume of the actuating cartridge 19 causes axial displacement of the piston 15 and piston rod 17 in the direction of arrow X. Such movement closes the switch 21 thereby activating the warning light 22 in the aircraft cockpit. Since the switch 21 is of the latching type, the alarm continues even in the case of a subsequent temperature drop within the housing 11.

The foregoing description is provided for illustrative purposes only and should not be construed as in any way limiting this invention, the scope of which is defined solely by the appended claims.

I claim:

1. Apparatus for detecting fuel vapors in the atmosphere in an enclosure comprising:
   a) a housing defining an inner chamber;
   b) a piston slidably located in the inner chamber so as to divide the inner chamber into a first chamber portion and a second chamber portion;
   c) an actuating cartridge located in the second chamber portion comprising a fluorinated silicone elastomer which expands in volume when subjected to heat and which produces an exothermic reaction in the presence of fuel vapors;
   d) at least one orifice defined by the housing located so as to allow communication of the atmosphere in the enclosure with the second chamber portion such that fuel vapor in the atmosphere will cause the actuating cartridge to expand in volume, thereby moving the piston relative to the housing; and,
   e) alarm means actuated by movement of the piston.

2. The apparatus of claim 1 wherein the actuating cartridge comprises between the piston and an end wall of the housing.

3. The apparatus of claim 1 wherein the actuating cartridge comprises:
   a) a layer of the fluorinated silicone elastomer which produces an exothermic reaction when exposed to fuel vapors; and,
   b) a layer of second material which expands in volume when subjected to heat generated by the exothermic reaction of the fluorinated silicone elastomer.

4. The apparatus of claim 3 wherein the second material comprises a wax.

5. The apparatus of claim 3 further comprising a metal partition located between the layers.

6. The apparatus of claim 3 wherein the layer of second material is located between the piston and the layer of the fluorinated silicone elastomer.

7. The apparatus of claim 1 wherein the alarm means comprises:
   a) an electrically powered alarm having switch means to control the activation of the alarm; and,
   b) a piston rod attached to the piston so as to move therewith and located such that movement of the piston causes the piston rod to actuate the switch means so as to activate the alarm.

* * * * *